Dec. 26, 1961 J. I. GARD 3,014,760
COMBINATION GOLF CART AND CHAIR
Filed Aug. 11, 1959 2 Sheets-Sheet 2
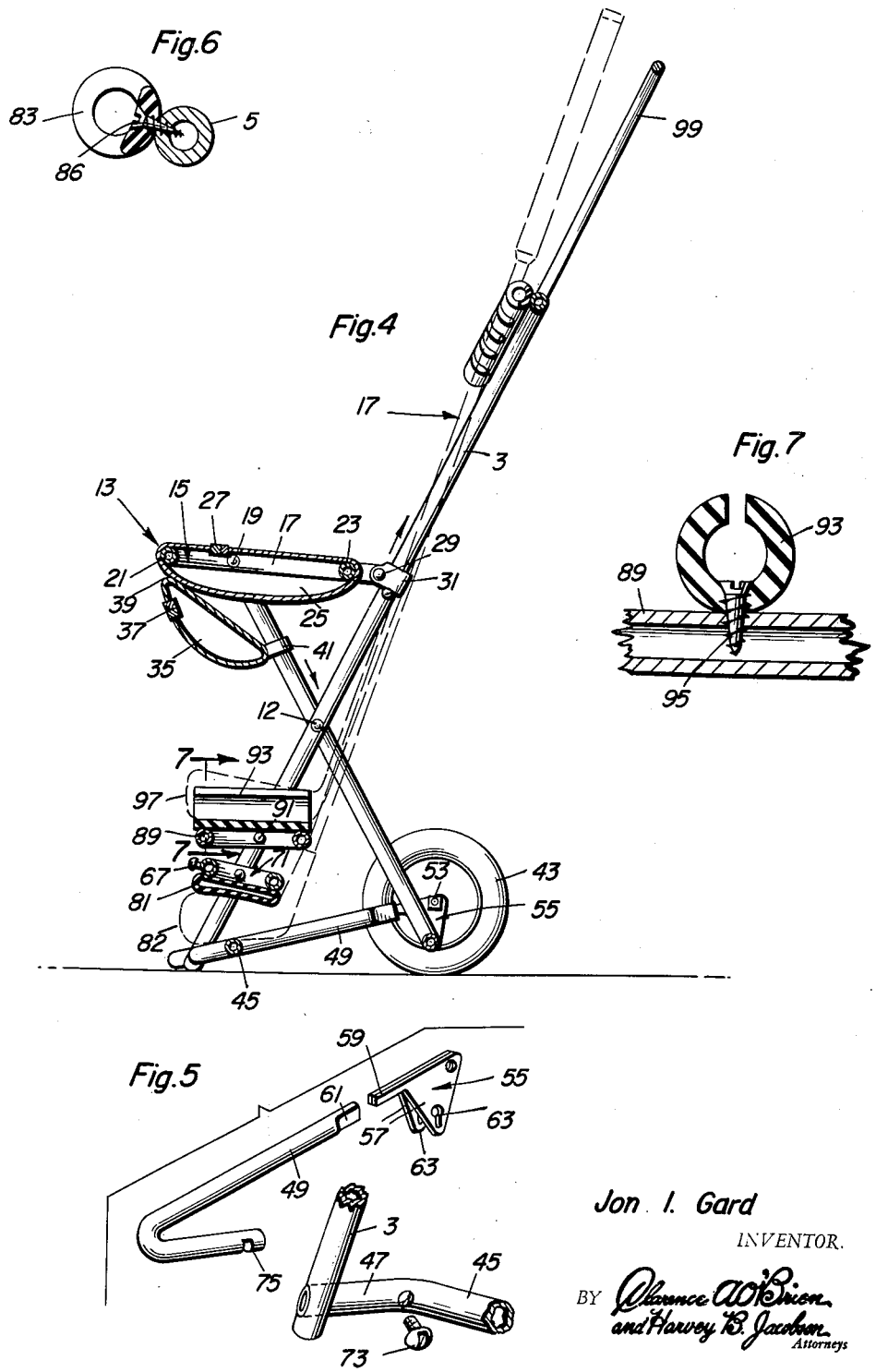
Jon I. Gard
INVENTOR.

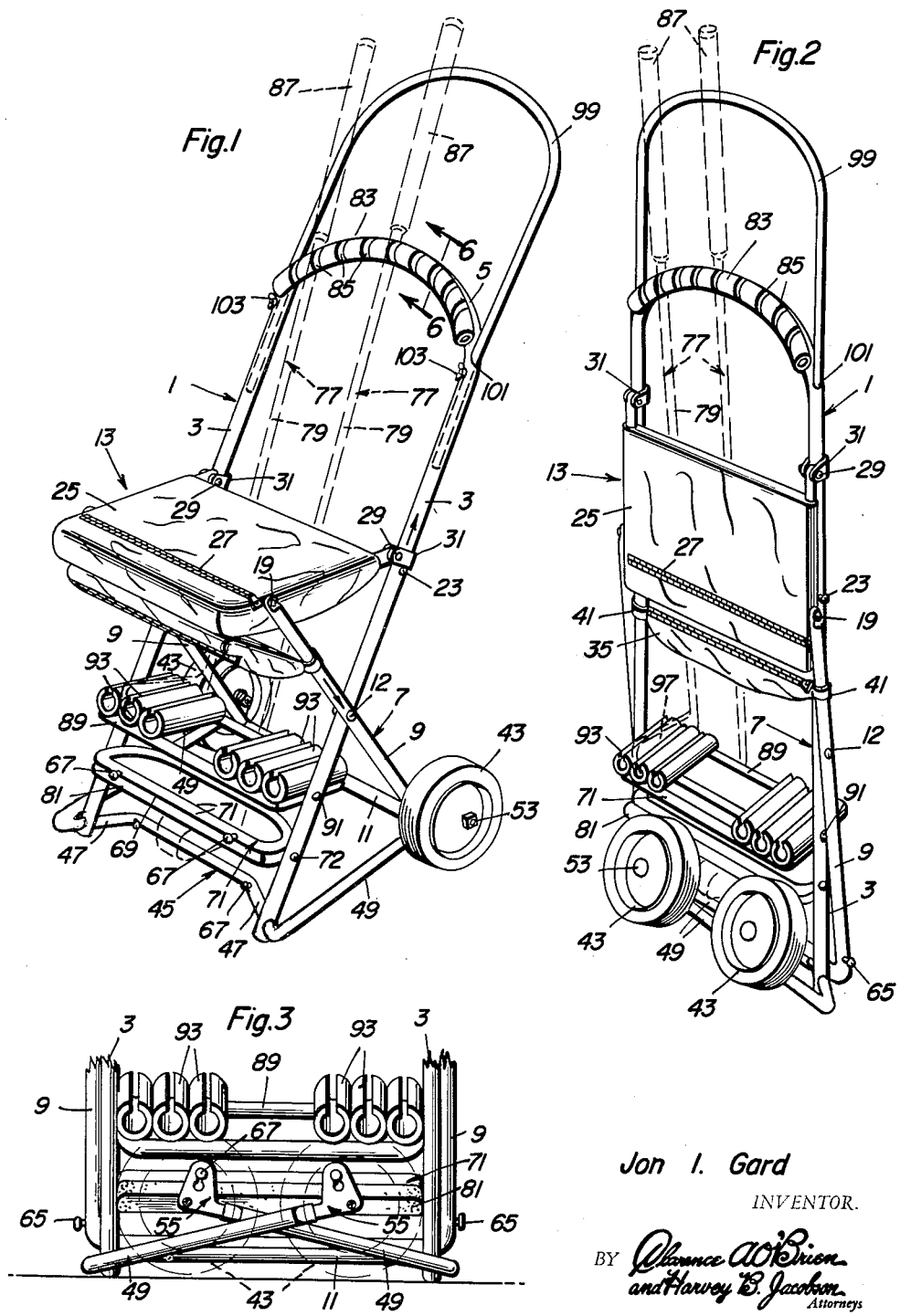

United States Patent Office 3,014,760
Patented Dec. 26, 1961

3,014,760
COMBINATION GOLF CART AND CHAIR
Jon I. Gard, 303 N. 10th St., Fairview, Okla.
Filed Aug. 11, 1959, Ser. No. 833,073
12 Claims. (Cl. 297—192)

This invention relates to an improved combination golf cart and wheelchair.

The primary object of the invention is to provide a golf cart for transporting golf clubs, golf balls, and other golf accessories, over and to and from a golf course and which is foldable into compact form for storage, or like purposes, and forms when unfolded both a golf cart and a wheelchair.

Another object is to provide a combination golf cart and wheelchair having means for holding golf clubs, without injury to the same and in a readily available position in which they will not interfere with use of the combination golf cart and wheel chair both as a golf cart and wheelchair or merely as a chair.

Still another object is to provide a combination golf cart and wheelchair according to the foregoing which is light in weight, yet strong and durable, and comparatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the combination golf cart and wheelchair unfolded;

FIGURE 2 is a perspective view of the same folded;

FIGURE 3 is an enlarged fragmentary view in front elevation, partly in broken lines, of the lower portion of the combination golf cart and wheelchair folded;

FIGURE 4 is an enlarged view in vertical section of the combination golf cart and wheelchair unfolded;

FIGURE 5 is an exploded view in perspective of parts of means for mounting one of the wheels;

FIGURE 6 is an enlarged view in cross-section taken on the line 6—6 of FIGURE 1, and FIGURE 7 is an enlarged view in cross-section taken on the line 7—7 of FIGURE 4.

Referring to the drawings by numerals, the combination golf cart and chair of this invention comprises, in the preferred embodiment thereof, and as its principal parts, a main upright, inverted U-shaped frame 1 including sides 3 and a top arch 5, and an upright auxiliary shorter U-shaped frame 7 having sides 9 and a transverse straight bottom 11.

The main and auxiliary frames 1, 7 are formed of steel or aluminum tubing and are pivoted together with the sides 3 of the main frame 1 and the sides 9 of the auxiliary frame 7 crossing each other and pivoted together by bolts 12 with the auxiliary frame 7 at the lower portion of the main frame 1 to form a cross leg type chair having the main frame 1 extending above the auxiliary frame 7 and a seat 13, presently described, so that the main frame 1 above the seat 13 forms a chair back. As best shown in FIGURE 2, the main and auxiliary frames 1, 7 are foldable on the bolts 12 toward each other into substantially parallel relation when the combination golf cart and wheelchair are folded.

The seat 13 comprises a rectangular frame 15, of steel or aluminum tubing, interposed endwise between upper terminals of the sides 9 of the auxiliary frame 7. The seat frame 15 is pivoted at intermediate points of its ends 17 by bolts 19 and comprises front and rear sides 21, 23. A suitably slit envelope 25 of flexible material having a closing top zipper 27 extends over the ends 17 and the sides 21, 23 of the seat frame 15 to complete the seat 13 and provides a pocket for towels, jackets, and other golfing accessories, not shown. The ends 17 of the seat frame 15 are terminally pivoted, as at 29, to clips 31 slidable upwardly and downwardly on the sides 3 of the main frame 1 so that when the combination golf cart and chair is folded the seat 13 may pivot on the bolts 19 counter-clockwise, as shown in the drawings into folded position substantially parallel to the main frame 1 and in front of said main frame, as shown in FIGURE 2. Stop screws 33 on the sides 3 limit downward sliding of the clips 31 to establish the seating position of the seat 13, as shown in FIGURES 1, 2 and 4.

A rectangular pocket 35 suitably closed by a zipper 37 is provided beneath the seat 13 for carrying therein golf balls, or golf tees, not shown. The pocket 35 is formed of suitable flexible material, and inclines downwardly and rearwardly below the seat 13 when the latter is unfolded. A top front edge 39 of the pocket 35 is suitably fixed, as by stitches, not shown, to the bottom and front of the envelope 25, and the rear corners of the pocket 35 are suitably attached to a pair of sleeves 41 on the sides 9 of the auxiliary frame 7 so that when the seat 13 is folded, the pocket 35 may slide downwardly to compensate for pivoting of the seat 13, and not interfere with folding of said seat as shown in FIGURES 1 and 4.

Means are provided for mounting a pair of rubber tired ground wheels 43 on the main and auxiliary frames 1, 7, to support the auxiliary frame 7 at the rear thereof and thereby support the main frame also while rolling on the ground to render the chair mobile. This means comprises a tubular cross round 45 of steel or aluminum tubing connecting the lower ends of the sides 3 of the main frame 1 and which is formed with angulated forwardly diverging, socket forming ends 47 extended through and suitably fixed to said sides 3. The ends 47 are angulated approximately 45 degrees relative to the bight portion of the cross round 45 disposed therebetween.

A pair of wheel carrying tubular arms 49 of steel or aluminum tubing are provided with return bent acute angled front ends, as at 51 journaled in the socket forming ends 47 for swinging downwardly and rearwardly to extend rearwardly alongside the lower portion of the main and auxiliary frames 1, 7 into an unfolded position, as shown in FIGURES 1 and 4, or to swing downwardly and forwardly into transverse, crossed folded position, as shown in FIGURES 2 and 3, in front of said main frame 1.

The wheels 43 are mounted on the rear ends of the wheel carrying arms 49 on lateral axle bolts 53 on one corner of triangular brackets 55 formed of a pair of resilient plates 57 diverging from the axle bolts 53 and having corner extensions 59 fixed in reduced flat sockets 61 on the rear ends of the wheel carrying arms 49. The plates 57, which is to say the brackets 55 are formed with corner keyhole slots 63 which fit over wing screws 65 in the lower portions of the auxiliary frame 7 to releasably hold the wheel carrying arms unfolded and the axle bolts 53 extending laterally from the sides of the auxiliary frame 7 so that the wheels 43 are in unfolded position, as shown in FIGURES 1 and 4. When the wheel carrying arms 49 are folded, and thereby fold the wheels 43, said arms are inverted together with the brackets 55 and the slots 63 fit over wing bolts 67 on the front side 69 of a frame 71, presently described, and with the wheels 43 positioned flatwise in front of the lower portion of the main frame 1 close to said frame, as shown in FIGURES 2 and 3. Setscrews 73 in the socket forming ends 47 of the cross-round 45 fit in slots 75 in the angulated ends 51 of the wheel carrying arms 49 and releasably hold said arms 49 in said socket forming ends 47. The resilient plates 57 on the brackets 55 act to expand said brackets to hold said brackets on the wing screws 65 or wing bolts 67 so as to prevent chattering of said brackets.

Gripping means is provided on the main and auxiliary frames 1, 7 for holding golf clubs 77, shown in broken lines, in upright position with the shafts 79 thereof upright behind the seat 13 and the heads of said golf clubs beneath the seat 13 and the pocket 35 and projecting forwardly.

The gripping means for the golf clubs includes the before mentioned cross round 45 and the frame 71, the latter having suitably secured on the underside thereof a resilient tubular plastic grip 81 of rectangular form coacting with the cross round 45 to grip, with a wedging action, wooden heads 73 of golf clubs 77 inserted rearwardly between said grip 81 and said cross round 45. The frame 71 is rectangular and secured at its ends by screws 72 to the sides 3 of the main frame 1 above the cross round 45 and the resilient tubular grip 81 is formed of resilient plastic and covers the frame 71 and is suitably secured to the bottom thereof.

An arcuate resilient grip 83 having forwardly opening, transverse notches 85 therein is secured by screws, as at 86, to the front side of the top arch 5 in a position to grip in the notches 85 thereof the shafts 79 of golf clubs 77 below the handles 87 of said clubs.

The gripping means for the golf clubs further includes a rectangular frame 89, of tubular steel or aluminum extending endwise between the sides 3 of the main frame 1 above the frame 71 and fixed as by bolts 91 to the sides 3 beneath the seat 13. Longitudinally split, upwardly opening grips 93 extend transversely on said frame 71 and are secured thereto, as by screws 95, in laterally spaced relation to grip in the slits thereof metal heads 97 of golf heads 77 having the shafts 79 thereof inserted in the notches 85.

An inverted U-shaped handle 99, of tubular steel or aluminum is slidably adjustably inserted downwardly into the sides 3 of the main frame 1 from the top arch 5 of said frame through openings 101 in said top arch 5 and is secured in adjusted position by set bolts 103 for manipulating the combination golf cart and wheelchair or for carrying the same.

As will now be seen, this invention provides a foldable cross leg chair with a hollow seat 13 and a pocket 35 for carrying golfing accessories, and the like, and a back extending above the seat, the chair back and the chair below said seat embodying gripping means for safely holding golf clubs in upright position such that they will not interfere with a person occupying the seat 13, and the chair may be wheeled with a person therein while golf clubs are disposed in the chair and the chair may be used merely for carrying golf clubs from place to place, when folded and forming a substantially flat compact rack for transportation along with golf clubs and accessories, in the trunk of an automobile, or for storage in a small space in a closet or the like.

The operation and use of the invention will, it is believed, be readily understood from the preceding description inasmuch as its use and operation has been set forth in conjunction with the description of the parts thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A chair comprising a pair of leg frames pivotally secured together the upper and lower ends of said frames forming a cross leg type folding chair, the upper end of one of said frames extending above the upper end of the other frame and constituting a back rest, a seat frame, means pivotally securing one end portion of said seat frame to the upper portion of said other frame and means pivotally and slidably securing the other end portion of said seat frame to said one frame for movement between a lower limit position with said seat frame generally horizontally disposed when said leg frames are extended in an upper folded position on said one frame substantially parallel to said leg frames when the latter are folded and substantially parallel, a pair of wheel supporting braces each having a wheel rotatably mounted on one end thereof, and means movably mounting said braces on opposite sides of the lower end of said one frame for movement of said braces between a first position extending rearwardly to corresponding sides of the lower end portion of said other frame when said frames are extended and a second position with said braces each extending toward the opposite side of said one frame across the lower end thereof, resilient means on said back above said seat for gripping the shafts of golf clubs arranged upright behind said seat, and resilient means on said chair beneath said seat for gripping the heads of the golf clubs having their shafts gripped by the gripping means on said back.

2. The combination of claim 1, said resilient means on said back comprising a tubular grip of resilient material extending across said back and having transverse notches therein for receiving golf club shafts.

3. The combination of claim 1, said resilient means on said chair beneath said seat comprising a fixed frame having a resilient bottom member thereon, and a cross round in said chair beneath said member coacting with said member to grip therebetween heads of golf clubs having their shafts gripped by the gripping means on said back.

4. The combination of claim 1, said means on said chair beneath said seat comprising a fixed frame and tubular longitudinally split resilient grips on said frame for receiving and gripping therein heads of golf clubs having their shafts gripped by the gripping means on said back.

5. The combination of claim 1 including a pair of wheels and means mounting said wheels on said chair to roll at the rear of the chair whereby said chair is adapted to be supported by said wheels and be rolled along a supporting surface.

6. The combination of claim 1, said seat comprising an envelope for containing golf accessories.

7. The combination of claim 1 and a pocket for golf balls and/or golf tees suspended from said seat.

8. A chair comprising a pair of leg frames pivotally secured together the upper and lower ends of said frames forming a cross leg type folding chair, the upper end of one of said frames extending above the upper end of the other frame and constituting a back rest, a seat frame, means pivotally securing one end portion of said seat frame to the upper portion of said other frame and means pivotally and slidably securing the other end portion of said seat frame to said one frame for movement between a lower limit position with said seat frame generally horizontally disposed when said leg frames are extended in an upper folded position on said one frame substantially parallel to said leg frames when the latter are folded and substantially parallel, a pair of wheel supporting braces each having a wheel rotatably mounted on one end thereof, and means movably mounting said braces on opposite sides of the lower end of said one frame for movement of said braces between a first position extending rearwardly to corresponding sides of the lower end portion of said other frame when said frames are extended and a second position with said braces each extending toward the opposite side of said one frame across the lower end thereof 9. The combination of claim 8 including means on the other ends of said braces for removably securing said other ends to the lower side portions of said other frame.

10. The combination of claim 8 including means removably securing each of said other ends of said braces to the lower portion of said one frame adjacent the side thereof remote from the side thereof to which the corresponding one end of each brace is secured.

11. The combination of claim 8 wherein said wheels are disposed in side-by-side spaced relation with their axes of rotation substantially aligned when said braces are disposed in said first position.

12. The combination of claim 8 wherein said wheels are aligned and disposed in spaced relation with their axes of rotation substantially parallel when said braces are disposed in said second position.

References Cited in the file of this patent

UNITED STATES PATENTS

| | | |
|---|---|---|
| 2,438,078 | Sutphen | Mar. 16, 1948 |
| 2,539,336 | Sobers | Jan. 23, 1951 |
| 2,726,875 | Murcott | Dec. 13, 1955 |
| 2,758,848 | Christensen | Aug. 14, 1956 |
| 2,880,012 | Wilson | Mar. 31, 1959 |